J. BLUM.
ROACH TRAP.
APPLICATION FILED APR. 22, 1914.

1,128,946.

Patented Feb. 16, 1915.
2 SHEETS—SHEET 1.

Inventor
Joseph Blum.

Witnesses

J. BLUM.
ROACH TRAP.
APPLICATION FILED APR. 22, 1914.

1,128,946.

Patented Feb. 16, 1915.
2 SHEETS—SHEET 2.

Inventor
Joseph Blum.

Witnesses

UNITED STATES PATENT OFFICE.

JOSEPH BLUM, OF NEW YORK, N. Y.

ROACH-TRAP.

1,128,946.  Specification of Letters Patent.  Patented Feb. 16, 1915.

Application filed April 22, 1914. Serial No. 833,746.

*To all whom it may concern:*

Be it known that I, JOSEPH BLUM, a citizen of the United States, residing at Bronx, New York city, in the county of Bronx and State of New York, have invented certain new and useful Improvements in Roach-Traps, of which the following is a specification.

This invention relates to traps and more particularly to a device of this character specifically designed for trapping roaches.

An object of this invention is the provision of a roach trap embodying a plurality of entrance channels, a plurality of pivoted bait holders at the upper end thereof, and a suitable receptacle located under the bait holder adapted to receive the insects falling from the upper ends of the entrance channels.

Another object is the provision of a device of this character which shall be of simple construction, efficient in use, and inexpensive to manufacture.

Figure 1:
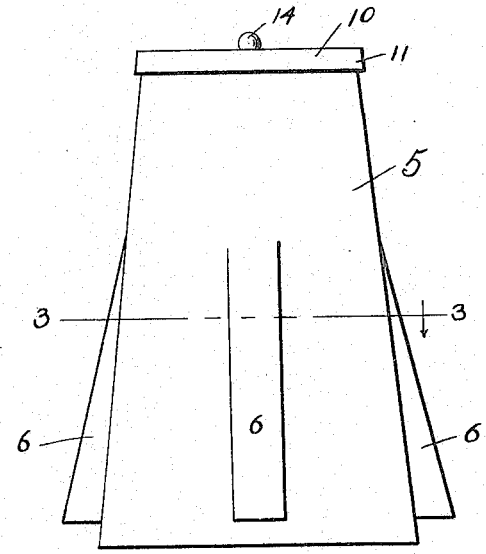
Figure 2:
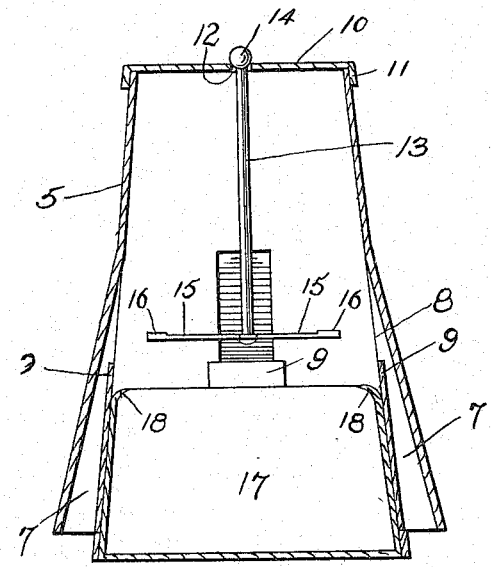
Figure 3:
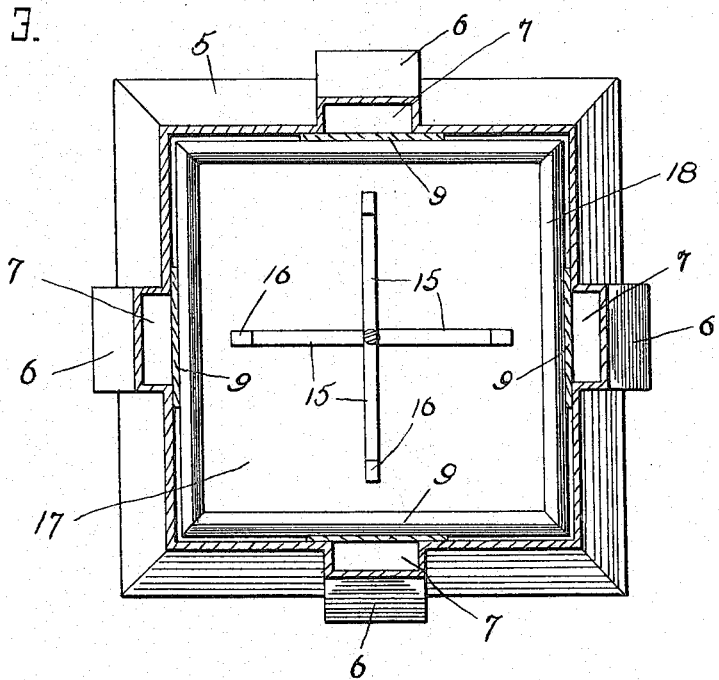
Figure 4:
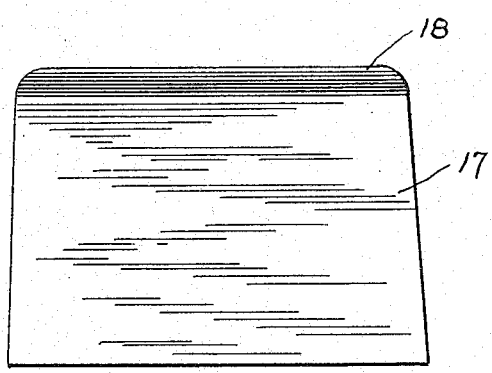

With these and other objects in view, the invention consists in the novel construction, arrangement and combination of parts as will be hereinafter specifically described, claimed and illustrated in the accompanying drawings, in which, Figure 1 represents a side elevation of the trap, Fig. 2 represents a central vertical sectional view therethrough, Fig. 3 represents a horizontal sectional view therethrough, and, Fig. 4 represents a side elevation of the liquid container removed.

Referring to the drawing in detail, wherein similar reference numerals designate corresponding parts throughout the several views, the numeral 5 indicates a housing formed of suitable material, preferably rectilinear in cross section and tapered from its lower to its upper end. The lower end of the housing 5 is open, and also the upper end thereof which latter is adapted to be closed by a suitable cap or cover 10 having downwardly directed side flanges 11.

Each of the side walls of the housing is struck outwardly on a vertical line, as indicated at 6, to provide vertically disposed entrance channels 7 gradually tapered from their lower to their upper ends and communicating with the interior of the housing by an opening 8. A partition 9 is secured against the inner faces of the walls of the body and separates the lower portions of the channels 7 from the lower part of the housing 5.

The cap or cover 10 is provided with an aperture 12 receiving the vertically disposed shank 13 of the combined bait holder and tread plates. A ball 14 is secured to or formed integrally with the shank 13 and engages against the face of the cover 10 for pivotally supporting the shank 13. The lower end of the shank 13 is provided with a plurality of radially directed arms 15 corresponding in number to the number of channels 7 in the housing 5 and terminating in proximity to the inner ends 8 of said passages or channels. Tread plates 16 are secured on the outer ends of the arms 15 and are adapted to provide a support for the bait for the trap.

A liquid container 17 is removably disposed in the lower end of the housing 5 and is shaped conformably therewith and is turned inwardly at its upper edge 18 for preventing the insects from crawling from the container.

In use, the receptacle 7 is partially filled with a liquid, poison, if desired, and bait placed on the tread plate 16. An insect attracted by the bait crawls upwardly upon the wall of one of the channels 7, passes through the opening 8 and thence upon the adjacent tread plate 16, which latter swings outwardly from the insect under its weight and the insect drops into the container 17 where it is drowned.

What I claim is:—

1. A trap comprising a housing, vertically disposed channels exteriorly of said housing and communicating with the latter, a cover on said housing, a bait holder comprising a plurality of radiating arms and a vertically disposed shank, a ball at the upper end of said shank engaging said cover and pivotally supporting the bait holder, and a liquid container removably seated in the lower end of said trap.

2. A trap comprising a housing having upwardly converging side walls, a cover for said housing, a liquid container removably seated in the lower end of said housing, said housing having openings in the side walls thereof above said liquid container, a bait holder including a plurality of radiating arms, and a vertically disposed shank pivotally secured at its upper end in said cover.

In testimony whereof I affix my signature in presence of two witnesses.

JOSEPH BLUM.

Witnesses:
PHILIPP BUCHOLD,
CHARLES HARTMANN.